(12) United States Patent
Yang et al.

(10) Patent No.: US 9,776,664 B2
(45) Date of Patent: Oct. 3, 2017

(54) IMPACT TRANSMISSION STRUCTURE

(71) Applicant: Honda Motor Co., Ltd., Minato-ku, Tokyo (JP)

(72) Inventors: Siyang Yang, Dublin, OH (US); Shuo Fang, Dublin, OH (US); Lando C. Hamlett, Marysville, OH (US); Anthony Ordonio, Jr., Dublin, OH (US); Ryan Matthew Stokes, Dublin, OH (US); Yoshihisa Sugamata, Dublin, OH (US); Andrew K. Swayne, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 14/662,093

(22) Filed: Mar. 18, 2015

(65) Prior Publication Data

US 2016/0272249 A1 Sep. 22, 2016

(51) Int. Cl.
| | |
|---|---|
| *B62D 21/15* | (2006.01) |
| *B60R 21/0136* | (2006.01) |
| *B60R 21/207* | (2006.01) |
| *B62D 25/02* | (2006.01) |
| *B60R 21/231* | (2011.01) |
| *B60R 21/01* | (2006.01) |

(52) U.S. Cl.
CPC ........ *B62D 21/157* (2013.01); *B60R 21/0136* (2013.01); *B62D 25/025* (2013.01); *B60R 21/207* (2013.01); *B60R 21/23138* (2013.01); *B60R 2021/01211* (2013.01); *B60R 2021/23146* (2013.01); *B62D 25/02* (2013.01)

(58) Field of Classification Search
CPC .... B62D 21/157; B62D 25/02; B62D 25/025; B60R 21/23138; B60R 21/0136; B60R 21/207; B60R 2021/23146; B60R 2021/01211
USPC ............... 296/187.12, 209; 280/743.1, 728.1
See application file for complete search history.

(56) References Cited

U.S. PATENT DOCUMENTS

| | | | |
|---|---|---|---|
| 5,000,509 A | 3/1991 | Sinnhuber et al. | |
| 5,641,194 A | 6/1997 | Honma et al. | |
| 5,782,525 A | 7/1998 | Honma et al. | |
| 6,053,564 A | 4/2000 | Kamata et al. | |
| 6,299,238 B1 * | 10/2001 | Takagi | B60N 2/4235 296/187.12 |
| 6,592,166 B2 | 7/2003 | Motozawa | |

(Continued)

FOREIGN PATENT DOCUMENTS

| | | |
|---|---|---|
| DE | 102005043698 A1 | 3/2007 |
| EP | 2336007 A1 | 6/2011 |

(Continued)

*Primary Examiner* — Joseph D Pape
*Assistant Examiner* — Dana Ivey
(74) *Attorney, Agent, or Firm* — Arent Fox LLP

(57) ABSTRACT

The present disclosure provides a vehicle including a frame having a side sill reinforcement, the side sill reinforcement running along a length of a side of the frame, and an impact transmission structure mounted to and extending laterally outward from an exterior surface of the side sill reinforcement, the impact transmission structure having a stiffness approximately equal to a stiffness of the side sill reinforcement and being configured to communicate an impact force resulting from a side impact into the vehicle into the frame and not absorb the impact force.

19 Claims, 7 Drawing Sheets

(56) References Cited

U.S. PATENT DOCUMENTS

| | | |
|---|---|---|
| 6,941,719 B2 | 9/2005 | Busseuil et al. |
| 7,519,460 B2 | 4/2009 | Roelleke et al. |
| 7,527,288 B2 | 5/2009 | Breed |
| 7,762,620 B2 | 7/2010 | Yao |
| 8,007,038 B2 | 8/2011 | Stoeckl |
| 8,118,355 B2 | 2/2012 | Tamura et al. |
| 8,282,154 B2 | 10/2012 | Maruyama |
| 8,366,185 B2 | 2/2013 | Herntier |
| 8,439,428 B2 | 5/2013 | Imamura |
| 8,439,429 B2 | 5/2013 | Shida et al. |
| 2013/0088045 A1* | 4/2013 | Charbonneau ....... B62D 21/157 296/187.12 |
| 2013/0168997 A1* | 7/2013 | Kurokawa ............. B60J 5/0451 296/146.6 |

FOREIGN PATENT DOCUMENTS

| | | |
|---|---|---|
| EP | 2412612 A1 | 2/2012 |
| WO | 2006066966 A1 | 6/2006 |

* cited by examiner

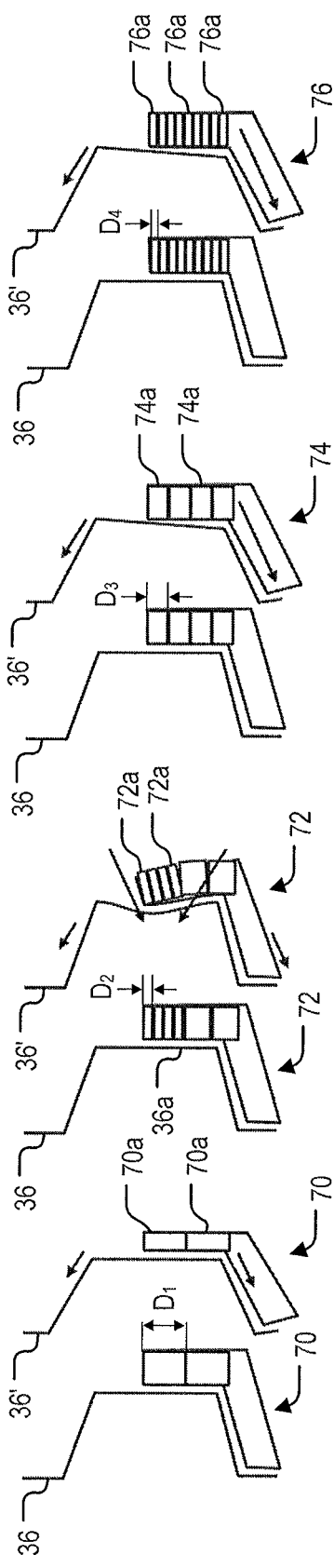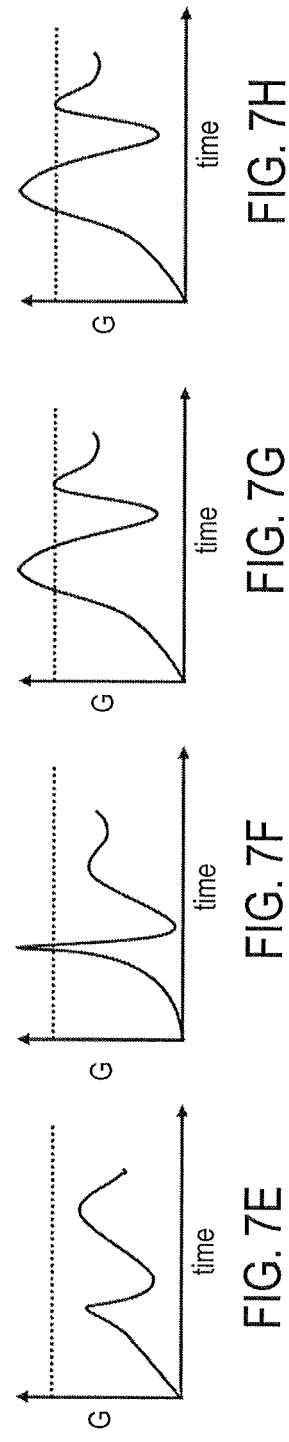

IMPACT TRANSMISSION STRUCTURE

BACKGROUND OF THE INVENTION

The disclosure relates, in general, to a vehicle safety system and, more particularly, to an impact transmission structure for use with a side impact detection system.

In general, a vehicle such as a passenger car or truck may include a side impact system for the detection of a side impact of the vehicle. One example of a side impact system includes one or more acceleration sensors and one or more airbags or other safety devices. In one example, a first acceleration sensor may be placed in association with an ECU (Electric Control Unit) provided on a floor of the vehicle, while a second acceleration sensor may be provided around an outer frame or body side structure at a side of the vehicle. When at least one of the acceleration sensors detect a side impact, the side impact system may deploy one or more restraint devices such as a side airbag. The airbags may be deployed from a roof side rail, a seat, or another location within the vehicle. Once deployed, the airbag may expand to fill at least a portion of the space between the occupant of the vehicle and the interior side of the vehicle. For example, the side impact system may expand a side airbag along an interior surface of a side door so as to cover a space between an occupant and the side door. However, in designing a side impact system for a vehicle, several challenges may arise. Accordingly, there is a need for further improvements in the field of side impact systems.

SUMMARY OF THE INVENTION

According to one embodiment of the present disclosure, a vehicle includes a frame including a side sill reinforcement, the side sill reinforcement running along a length of a side of the frame, and an impact transmission structure mounted to and extending laterally outward from an exterior surface of the side sill reinforcement, the impact transmission structure having a stiffness approximately equal to a stiffness of the side sill reinforcement and being configured to communicate an impact force resulting from a side impact into the vehicle into the frame and not absorb the impact force.

According to another embodiment of the present disclosure, an impact transmission structure includes a body including a honeycomb structure, the honeycomb structure including a plurality of polyhedral structures, each one of the plurality of polyhedral structures having a primary axis, and a mounting face formed along an exterior surface of the body, the mounting face configured to mount to an exterior surface of a side sill reinforcement extending along a side of a vehicle, wherein, when the mounting face is mounted to the exterior surface of the side sill reinforcement, the primary axes of the plurality of polyhedral structures are orthogonal to the side sill reinforcement. A stiffness of the honeycomb structure is approximately equal to a stiffness of the side sill reinforcement extending along the side of the vehicle.

According to a further embodiment of the present disclosure, a vehicle includes a body, the body including a side sill reinforcement projecting laterally outward from an exterior of the body, the sill extending at least partially between a front end and a rear end of the body, a seat mounted to the body, an impact transmission structure abutting the side sill reinforcement proximate the seat and extending laterally outward from an exterior surface of the side sill reinforcement, a door coupled to the body, the door having an interior panel and an exterior panel, and an airbag coupled to at least one of the body and the seat and deployable between an occupant positioned in the seat and the door to occupy a lateral distance (Y) between an outside edge of the occupant and the interior panel of the door. A width (B) of the impact transmission structure is determined by at least a lateral distance (A) between an exterior surface of the sill and the exterior panel of the door, a lateral distance (X) between the outside edge of the occupant and the interior panel of the door, and the lateral distance of an airbag deployable between the occupant and the interior panel of the door (Y).

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIG. 7A is a schematic illustration of an embodiment of an impact transmission structure including a honeycomb structure having polyhedral structures with a relatively large diameter, $D_1$.

FIG. 7B is a schematic illustration of an embodiment of an impact transmission structure including a honeycomb structure having polyhedral structures with a relatively small diameter, $D_2$, positioned proximate a center point of a side sill of a vehicle.

FIG. 7C is a schematic illustration of an embodiment of an impact transmission structure including a honeycomb structure having polyhedral structures with a moderate diameter, $D_3$, selected to match the stiffness of the impact transmission structure to the stiffness of a side sill of a vehicle to which the impact transmission structure is mounted.

FIG. 7D is a schematic illustration of an embodiment of an impact transmission structure including a honeycomb structure having polyhedral structures with a very small diameter, $D_4$, such that the stiffness of the impact transmission structure exceeds the stiffness of a side sill of a vehicle to which the impact transmission structure is mounted.

FIG. 7E is an example signal profile showing acceleration as a function of time as detected by a side impact system of a vehicle for the impact transmission structure of FIG. 7A.

FIG. 7F is an example signal profile showing acceleration as a function of time as detected by a side impact system of a vehicle for the impact transmission structure of FIG. 7B.

FIG. 7G is an example signal profile showing acceleration as a function of time as detected by a side impact system of a vehicle for the impact transmission structure of FIG. 7C.

FIG. 7H is an example side impact transmission signal profile showing acceleration as a function of time as detected by a side impact system of a vehicle for the impact transmission structure of FIG. 7D.

Like reference numerals will be used to refer to like parts from figure to figure throughout the following detailed description.

DETAILED DESCRIPTION OF THE INVENTION

Figure 1A:
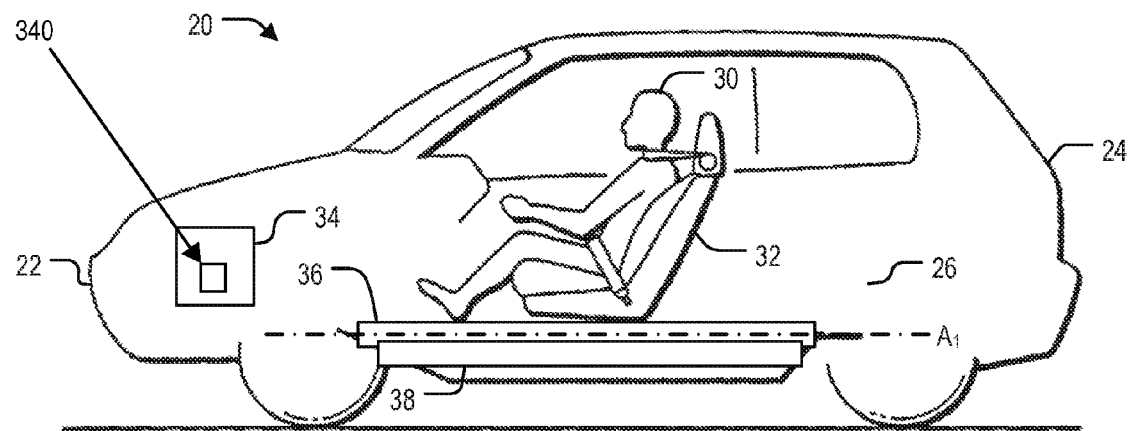
FIG. 1A is a schematic illustration of a left side view of a vehicle including an embodiment of an impact transmission structure according to the present disclosure.

The present invention is presented in several varying embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the invention.

In designing a side impact system for a vehicle, several challenges may arise. First, it may be useful to configure a side impact system to discriminate between side impact events that may or may not warrant actuation of a safety system of the vehicle (e.g., deployment of a side airbag). Second, it may be useful to provide a side impact system that is capable of efficiently detecting and responding to a side impact event. With respect to the first point, in certain situations, a vehicle may experience a side impact event that may not warrant actuation of a safety system. For example, a passenger of the vehicle may open a door of the vehicle into an obstacle such as a wall, a pole, a curb, another vehicle, or the like. In such a situation, deployment of an airbag or actuation of another safety system of the vehicle may be superfluous. However, in other situations, a parked or moving vehicle may experience a side impact event that may, in fact, warrant actuation of a safety system. For example, a vehicle may be struck on the side by another vehicle or object with a force of a magnitude on an occupant that may be mitigated through deployment of an airbag or actuation of another safety system of the vehicle. Accordingly, it may be useful to provide a side impact system capable of discriminating between various side impact events.

With respect to the second point, in some circumstances, a side impact system may have to expand a side airbag relatively quickly as compared with, for example, a front airbag. In the case of a side impact (such as an object impacting the side of the front row seating of a vehicle), there is little time for a side impact system to detect the impact and deploy an airbag before the intrusion of the striking object into the passenger compartment. In the case of a system including one or more acceleration sensors as described above and for various reasons, the side impact system is generally configured to sense an impact to the frame/body structure of the vehicle, such as a side sill, as opposed to the door of the vehicle. Thus, in order for a side impact system to deploy an airbag or activate another component of a supplemental restraint system (SRS), the impacting object must first interact with the side sill reinforcement of the vehicle.

Further challenges may arise for new vehicle designs having a door and seat design that is outboard relative to the structure of the vehicle, such as the outer side sill reinforcement of the vehicle. Due to the recessed position of the side sill with respect to the door and seat, the sensors may have insufficient time for airbag deployment relative to survival space intrusion during a side impact event (i.e., a collision between the side of the vehicle and an object). The survival space may be defined as the unoccupied volume located within the vehicle cabin between an occupant of the vehicle and an interior panel, or other like vehicle structure. In one aspect, the survival space may be specified before or immediately following a side impact, which may reduce the unoccupied volume as defined above. During use of conventional acceleration sensor systems, the interaction of an object with the outer side sill reinforcement provides a crash signal too late to provide sufficient time for side air bag deployment when the door and seat are positioned outboard from the sill. The result is that the side air bag may have insufficient space for deployment or may become trapped between the passenger and the side door. Accordingly, there is a need for an improved system and method for the efficient, rapid, early, or accurate detection of a side impact event (or a combination thereof).

As discussed above and in various situations, it may be useful to provide a vehicle with a side impact detection system. Such a system may be used to deploy a safety device such as a side curtain airbag in the event that the vehicle experiences a side impact. For example, a passenger vehicle may experience an impact with an object in which the object intrudes into a side of the vehicle. Depending on the rate of impact of the object with the side of the vehicle, the location of impact, the angle at which the object impacts the vehicle, or other factors associated with the circumstance of the impact event, it may or may not be useful to deploy one or more side airbags within the vehicle. In order to accurately detect a situation in which it may be useful to deploy a side airbag, one or more accelerometers or other like sensors may be located on a frame or body structure of the vehicle, such as a side sill reinforcement of a vehicle. The accelerometers may be configured to actuate a response from a side impact system upon detection of an impact between an object and the frame or body structure of the vehicle. Further, the side impact system may be configured to discriminate between various side impact events depending on the characteristics of a side impact signal transmitted to a sensor or detector of the vehicle.

In certain vehicle designs, the side sill reinforcement may not constitute the outermost portion of the side of a vehicle. For example, a vehicle design may include a door panel, side sill garnish, or other side panel that projects laterally outward from the side sill reinforcement. Therefore, an object may first impact a door or side panel of the vehicle before impacting the side sill reinforcement and providing an accurate signal to the accelerometers or other sensors of the side impact system. In one aspect, the initial impact of an object with a door or side panel of the vehicle may generate a side impact signal that is transmitted through structure of the vehicle. However, depending on the characteristics of the signal (e.g., duration, attenuation rate, peak height, peak width, and the like), it may be difficult for a side impact system to determine whether to deploy a side airbag or actuate another safety system of the vehicle. Moreover, depending on the design of the vehicle, the transmitted signal may be distorted or diminished leading to potentially greater difficulty in the ability of the side impact system to efficiently and accurately detect a side impact event.

In another aspect, given that the time available to react to a side impact may be on the order of milliseconds (ms), the time delay between an impact with a vehicle door or side panel and an impact with (or transmission of an impact signal to) the frame or body structure, such as a side sill reinforcement of the vehicle may constitute a significant amount of time. Accordingly, this delay may have an impact on the efficiency of a side impact system to react to an impact event. Further, in certain situations, this time delay may reduce the efficacy of a side impact system. For example, a side impact system may be configured to deploy a side airbag into an interior space between a side of the vehicle and a seat (or occupant within a seat) adjacent the side of the vehicle. However, during a side impact with an object, the object may intrude into a vehicle side panel, which in turn may project into an interior of the vehicle, thereby reducing or eliminating the interior space into which the airbag may deploy (i.e., the survival space). Accordingly, if a side impact system cannot efficiently detect and react to a side impact event, the side airbag may not be effectively deployed into the interior space. Various other problems may also arise based on factors such as the design of the vehicle, and the circumstances of the impact event.

Use of the disclosed impact transmission structure (ITS) may address these and other issues. In one embodiment, an ITS may be positioned outboard of the outer side sill reinforcement. The ITS may have be a relatively stiff structure formed from materials such as metal, plastic, composite materials, or the like to aid in carrying the side impact force load into the body of the vehicle. The ITS may be configured to accurately and efficiently transmit a side impact signal for detection by an accelerometer or another sensor or detector of a side impact system. Moreover, the ITS may provide a contact surface that is further outboard from the surface of the side sill to provide earlier crash detection. The ITS may be positioned between the side sill reinforcement and the side sill garnish. In another aspect, the ITS may transfer at least a portion of the crash energy to generate an effective crash signal for detection by a side impact system of the vehicle. Accordingly, the relative stiffness of the ITS may be equal to or greater than the relative stiffness of the side sill reinforcement.

Embodiments of an ITS may include a honeycomb structure composed of a plurality of closely packed polyhedral units. The honeycomb structure may be provided as a core structure or portion of the ITS. In one aspect, the honeycomb structure may provide a relatively high strength-to-weight ratio. In another aspect, the honeycomb structure may increase the force transfer for generating the crash signal. Accordingly, placement of the honeycomb structure outboard of the outer side sill reinforcement may result in earlier crash detection relative to the door or side panel intrusion rate (i.e., the rate at which the door or side panel of the vehicle projects into the interior of the vehicle following a side impact event).

Figure 5A:
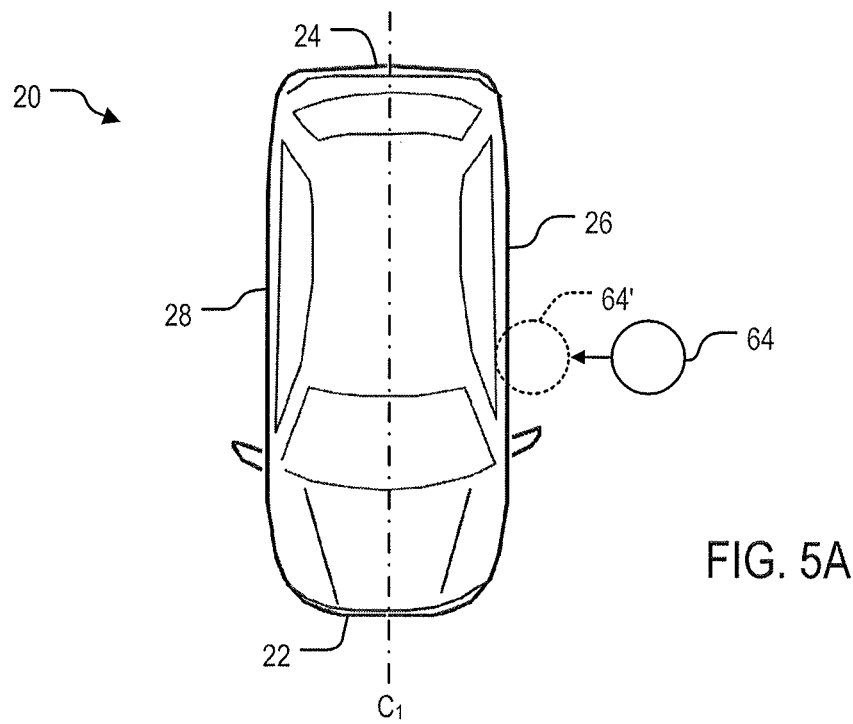
FIG. 5A is a top plan view of the vehicle of FIG. 1 further illustrating an object impacting a left side of the vehicle.

Turning now to FIG. 1A, an embodiment of a vehicle 20 includes a front end 22, a rear end 24 a left side or driver side 26 and a right side or a passenger side 28 (see FIG. 5A). The vehicle 20 may define an interior space for housing an occupant 30 (e.g., a driver or a passenger) in a seat 32. The vehicle 20 may further include a side impact system 34 for detecting a side impact event. In one aspect, the side impact system 34 may include one or more sensors, computers, or other components for detecting and reacting to a side impact event. For example, the side impact system 34 may include one or more accelerometers 340 in electrical communication with an electronic control unit (ECU). The ECU may further be in communication with one more safety systems, such as a side curtain airbag, a braking system, an engine system, a safety restraint, or another like component of the vehicle 20.

Figure 1B:
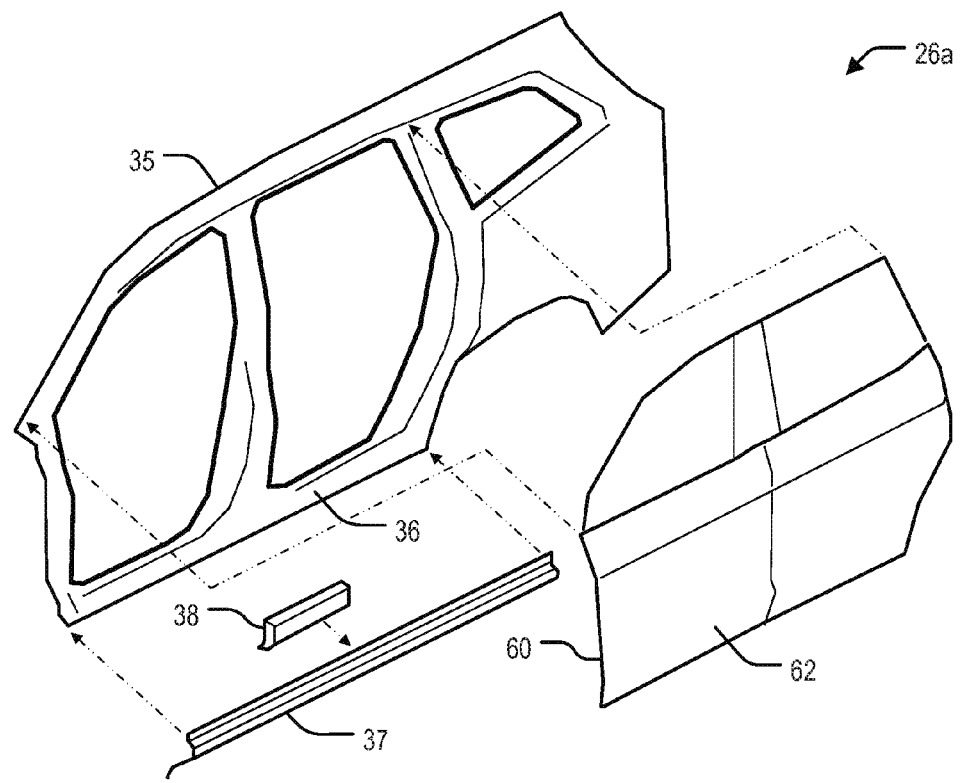
FIG. 1B is an exploded perspective view of a portion of the left side of the vehicle of FIG. 1A in isolation.
Figure 2:
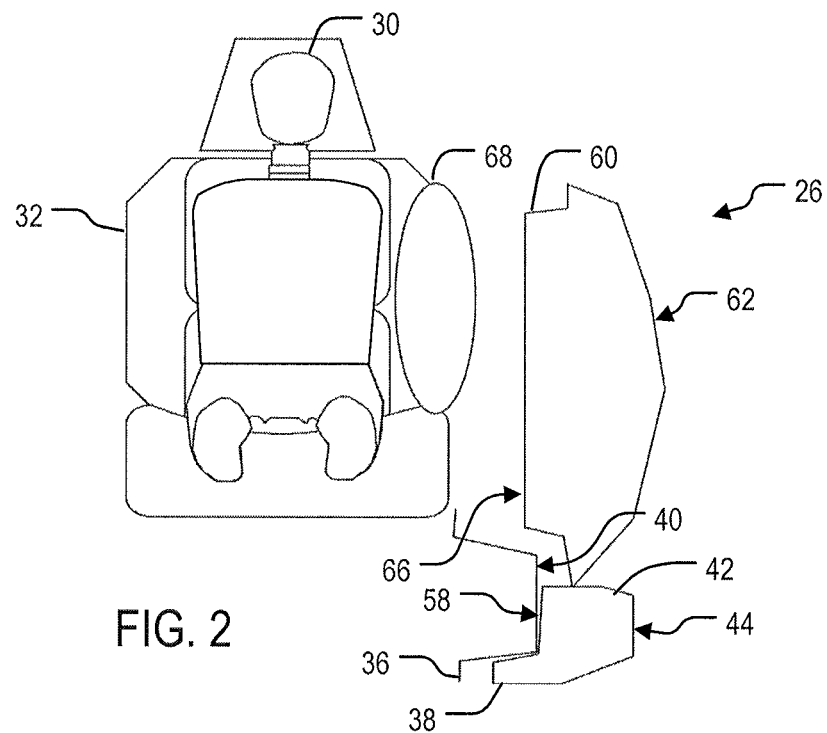
FIG. 2 is a schematic illustration of a partial front cross-sectional view of the vehicle of FIG. 1 showing the impact transmission structure with parts removed for clarity.
Figure 3:
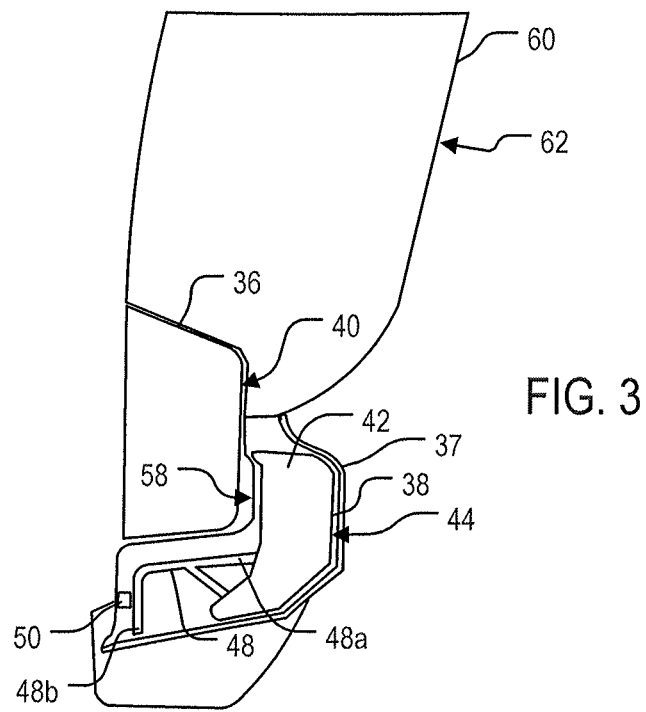
FIG. 3 is a partial cross-sectional similar to that of FIG. 2 showing additional details of the impact transmission structure.

As shown in FIGS. 1A and 1B, the vehicle 20 may further include a vehicle frame 35 including a side sill reinforcement 36. The side sill reinforcement 36 may extend along at least a portion of the length of the vehicle frame 35 between the front end 22 and the rear end 24. In the illustrated embodiment, the vehicle 20 may further include a side sill garnish 37 positioned generally along the length of the side sill reinforcement 36. The side sill garnish 37 may extend along one or both of the driver side 26 and the passenger side 28 of the side sill reinforcement 36 of the vehicle 20. In some embodiments, as illustrated at least in FIGS. 1A and 1B, the side sill reinforcement 36 or the side sill garnish 37 may be oriented such that an axis $A_1$ (see FIG. 1A) is substantially parallel to a ground surface (i.e., a surface upon which the vehicle is travelling) during a normal operation of the vehicle 20.

With reference to FIGS. 1A, 1B, 2-3, and 4A, an embodiment of an impact transmission structure (ITS) 38 is mounted or coupled to the vehicle 20 between the side sill garnish 37 and an outer surface 40 of the side sill reinforcement 36. In one aspect, the ITS 38 may abut the outer surface 40 of the side sill reinforcement 36. In another aspect, the ITS 38 may be glued, sonically welded, or otherwise attached to the side sill garnish 37, which may in turn, be mounted to the side sill reinforcement 36. In the case that the ITS 38 is not mounted or coupled directly to the outer surface 40 of the side sill reinforcement 36, the ITS 38 may be spaced apart from the side sill reinforcement 36. By comparison, in the case that the ITS 38 is not mounted or coupled directly to the side sill garnish 37, the ITS 38 may be spaced apart from the side sill garnish 37.

Figure 4A:
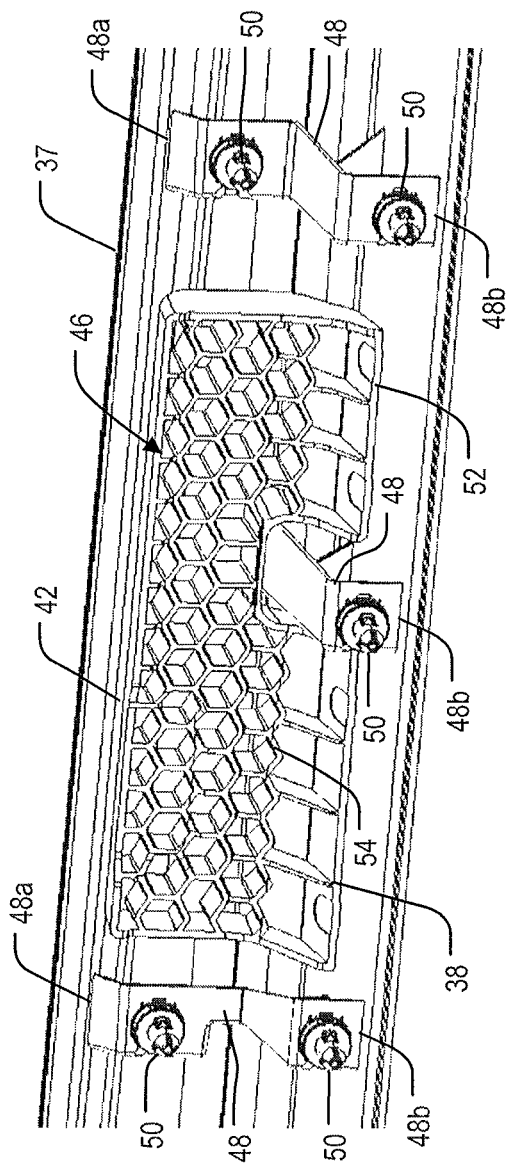
FIG. 4A is a schematic illustration of a partial rear side perspective view of an embodiment of an impact transmission structure showing an example of a honeycomb structure.

The ITS 38 includes a body 42 defining an exterior surface 44 of the ITS 38. The body 42 includes a core structure 46 formed within an interior portion of the body 42. The ITS 38 may be mounted to an inner side face of the side sill garnish 37 such that the ITS 38 is positioned laterally outward from a centerline ($C_1$) of the vehicle 20 (see FIG. 5A). The side sill garnish 37 includes a plurality of brackets 48. A first end 48a of each of the brackets 48 couples to the inner side face of the side sill garnish 37. A second end 48b of each of the brackets 48 opposing the first end 48a couples to the exterior surface 44 of the side sill reinforcement 36. In one aspect, the first end 48a may be bonded to or formed integrally with the side sill garnish 37. In another aspect, the second end 48b may include a fastener 50, such as a combination of washers, nuts and bolts. However, any suitable mounting method may be used to couple the brackets 48 to the side sill reinforcement 36, including welding, gluing, fastening, or the like. In another aspect, the ITS 38 may include passages, cutouts, recesses, or the like to accommodate the brackets 48. For example, FIG. 4A illustrates that at least one of the brackets 48 may pass through the body 42 of the ITS 38. Notably, one or more portions of the example ITS 38 may be substituted for another component or omitted altogether without departing from the scope of the present disclosure.

Figure 4C:
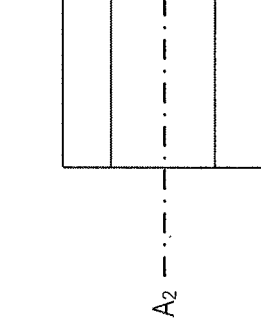
FIG. 4C is a front side view of a polyhedral structure of the honeycomb structure in isolation.
Figure 4B:
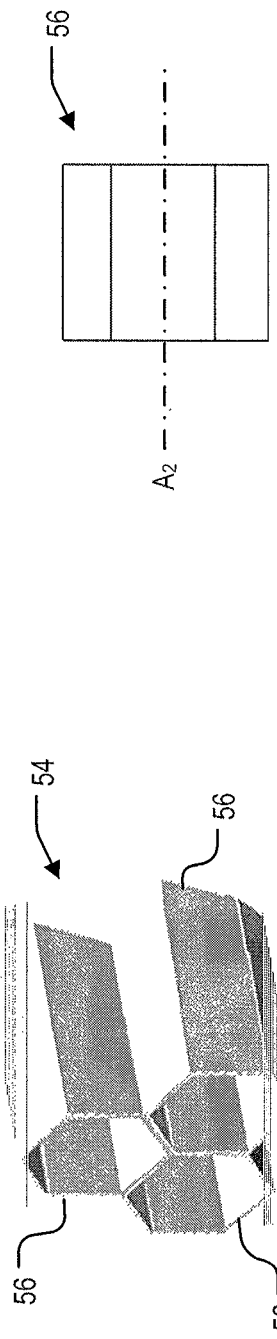
FIG. 4B is an enlarged partial perspective view of a portion of the honeycomb structure of FIG. 4.

With reference to at least FIGS. 4A-4C, the core structure 46 may include a honeycomb structure 54. The honeycomb structure 54 includes a plurality of polyhedral structures 56. In one aspect, each one of the polyhedral structures 56 is oriented along a primary axis $A_2$. In another aspect, the primary axis $A_2$ may be generally or completely orthogonal to the outer surface 40 of the side sill reinforcement 36. As shown in the illustrated embodiment of an ITS 38, each of the polyhedral structures 56 is a hexagonal prism. However, other embodiments of a honeycomb structure may include one or more different types of polyhedral structures. For example, suitable polyhedral structures may include triangular prisms or pyramids, rectangular prisms, pentagonal prisms, other polyhedra, or combinations thereof. The polyhedral may be arranged as a tessellation, or in another regular or irregular pattern.

In one aspect, the polyhedral that make up a honeycomb structure may be selected to provide the core structure with a given stiffness, strength, weight, or another structural characteristic. For example, the dimensions of each of the polyhedral structure may be varied including the length of each of wall segment, the width of the polyhedral structure along the axis $A_2$, the thickness of the wall segments (perpendicular to the axis $A_2$). Moreover, the relative placement of the core structure 46 with respect to the body 42 and the overall shape of the core structure 46 may be varied to achieve a given behavior of the ITS 38 during an impact event. For example the overall dimensions of the core structure 46, the placement of the core structure 46, or a combination thereof may have an influence on the force distribution of the ITS 38 on the side sill reinforcement 36 (or another component) of the vehicle 20 during an impact event.

The ITS 38 may further include a mounting face 58 formed along an exterior surface of the frame or body structure, the mounting face 58 configured to mount to the exterior surface 40 of the side sill reinforcement 36 extending along the driver side 26 or passenger side 28 of the vehicle 20. Alternatively (or in addition), the exterior surface 44 may be configured to mount or couple to an inner side face of the side sill garnish 37. In one aspect, when the ITS 38 is mounted to the exterior surface 40 of the side sill reinforcement 36, the side sill garnish 37, or a combination thereof, the primary axes $A_2$ of the plurality of polyhedral structures 56 are parallel to a ground surface. Additionally (or alternatively), the primary axes $A_2$ of the plurality of polyhedral structures 56 may be orthogonal to the outer surface 40 of the side sill reinforcement 36. Accordingly, in the illustrated embodiment, the axes $A_2$ may be substantially orthogonal to the axis $A_1$. In another aspect, a stiffness of the core structure 46 is approximately equal to a stiffness (in lateral compression) of the side sill reinforcement 36 extending along the driver side 26 or passenger side 28 of the vehicle 20.

In general, the stiffness of a material or structure may be defined as the slope of the stress-strain curve of the material. Stiffness (E) is the ratio of stress to strain ($\sigma/\epsilon$). Stress ($\sigma$) may be defined as the force applied to a material per unit area, while strain ($\epsilon$) may be defined as relative change in shape or deformation of a material for a given stress. One notable measure of stiffness include Young's modulus (i.e., modulus of elasticity), which describes the stiffness of a material in the elastic region during axial loading. However, other methods may be used to measure or quantify stiffness. Examples of other measures of stiffness include shear stiffness and torsional stiffness.

In selecting the stiffness of an ITS, it may be useful to match the stiffness of the ITS to one or more components of a vehicle. In one aspect, matching or tuning the stiffness of the ITS to a component of a vehicle may include selecting the stiffness of the ITS based on a preferred behavior of the ITS during a side impact event. For example, it may be useful for the ITS to transmit a given fraction or a defined amount of an applied force during a side impact. Accordingly, the stiffness of the ITS may be selected based on the stiffness of the components of the vehicle that are in direct or indirect contact with the ITS. Components to which the ITS is mounted or touching may be in direct contact with the ITS, whereas components to which the ITS is structurally connected or coupled for the transmission of mechanical energy to or from the ITS may be in indirect contact with the ITS. For example, an ITS mounted to a side sill may be in direct contact with the side sill and in indirect contact with an accelerometer that is mounted to the frame or body structure such as side sill and spaced apart from the ITS.

In the case that an ITS is mounted or coupled to a side sill of a vehicle frame, it may be useful to match the stiffness of the ITS to that of the side sill. In one aspect, the Young's modulus of the ITS may be selected to be equal to or greater than the Young's modulus of the side sill. In another aspect, the overall stiffness behavior (e.g., the shape of the stress-strain curve), or the stiffness behavior in a certain regime (e.g., the stiffness behavior for a defined range of applied force) for the ITS may be selected to be about equal to that of the side sill. In one embodiment, the stiffness of the ITS may be within about 25% of the stiffness of a vehicle components to which the ITS is coupled or mounted. In another embodiment, the stiffness of the ITS may be within about 15% of the stiffness of a vehicle components to which the ITS is coupled or mounted. In yet another embodiment, the stiffness of the ITS may be within about 5% of the stiffness of a vehicle components to which the ITS is coupled or mounted.

In various embodiments, the placement and dimensions of an ITS may have an effect on the time required to detect an impact event. In one aspect, an estimate of the time available for the detection of an impact event for a vehicle equipped with an ITS may be limited based on a target detection time for a side impact system to deploy a side airbag into an interior space between a interior side of the vehicle and a occupant. This relationship may be described generally by equation 1:

$$t_{estimate} \leq t_{target} \quad \text{(Eq. 1)}$$

where $t_{estimate}$ is the estimated time in milliseconds (ms) for the detection of a side impact event, and $t_{target}$ is the target detection time in ms for initiating the deployment of a side air bag following a side impact event. In one aspect, $t_{target}$ is the time it takes for a door or side panel of the vehicle to intrude to a critical point within the interior space between the door or side panel and a passenger of the vehicle, less the time it takes for the airbag to fully deploy. The critical point may be selected as the distance between the occupant and the door or side panel less the deployed width of the airbag.

Figure 5B:
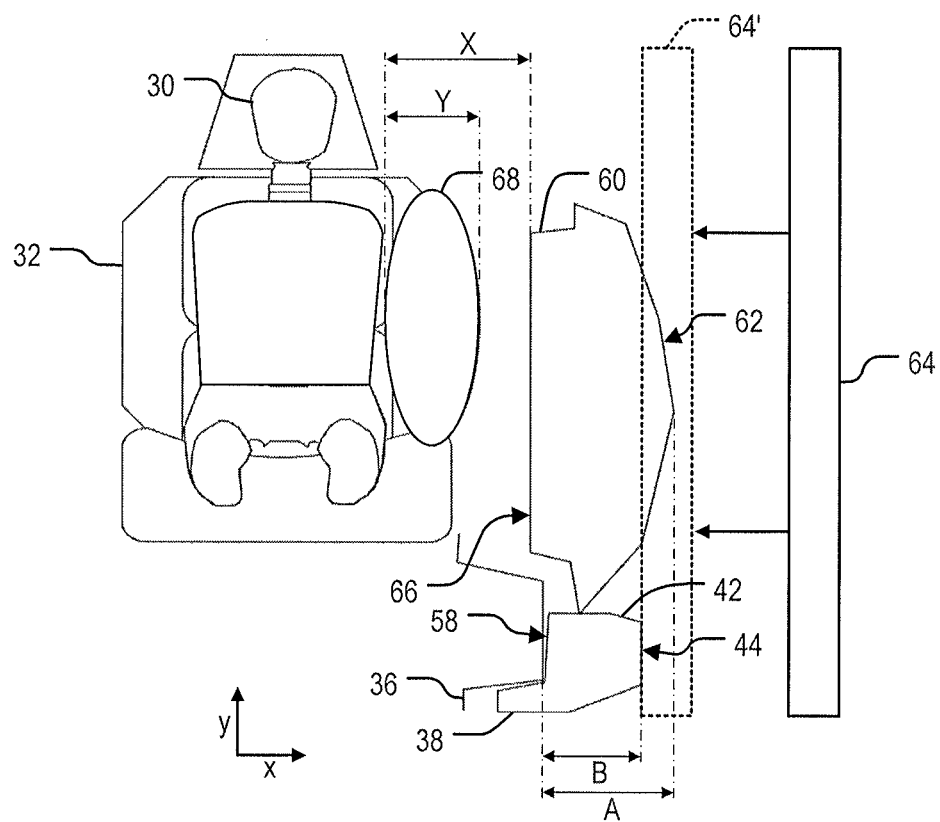
FIG. 5B is a schematic illustration similar to that of FIG. 2 showing a partial front cross-sectional view of the vehicle of FIG. 5A.

In one aspect, $t_{estimate}$ may be determined as a function of a lateral dimension of the ITS with respect to an outermost portion of a vehicle. With reference to FIG. 5B, a door 60 on the driver side 26 of the vehicle 20 has an outer surface 62 that extends laterally outward past the ITS 38 to define an outermost portion of the vehicle at least with respect to the cross-section shown in FIG. 5B. The relationship between $t_{estimate}$ and the dimensions of the vehicle 20 are described by equation 2:

$$t_{estimate} = \frac{A - B}{PS} + t_{delay} \quad \text{(Eq. 2)}$$

where A is the distance in millimeters (mm) between the outer surface 62 of the door 60 and the outer surface 40 of the side sill reinforcement 36, B is the effective width in mm of the ITS 38 (i.e., the distance in mm between the outer surface 44 of the ITS 38 and the outer surface 40 of the side sill reinforcement 36), PS is the rate of intrusion in mm per ms of an object 64 during a side impact event, and $t_{delay}$ is the delay in ms associated with the processing time for the hardware and software associated with the side impact system 34.

By comparison, the relationship between $t_{target}$ and the dimensions of the vehicle 20 are described by equation 3:

$$t_{target} = \frac{X - Y}{DS} - t_{fill} + t_{door} \quad \text{(Eq. 3)}$$

where X is the distance in mm between an interior surface 66 of the door 60 and outer edge of an occupant 30 of the vehicle 20, Y is the width in mm of the fully inflated side airbag 68, $t_{fill}$ is time in ms for the side airbag 68 to fully inflate, and $t_{door}$ is the time in ms associated with the delay between the initial impact of the object 64 with the outer surface 62 of the door 60 and a lateral displacement of the interior surface 66 of the door 60. As shown in FIGS. 5A and 5B, the object 64 may impact the outer surface 62 of the door 60 moving from right to left. Accordingly, the object 64' is illustrated as one possible future position of the object 64.

Equation 2 and equation 3 may be substituted into equation 1 and rearranged to solve for the effective width of the ITS 38 (B) as shown in equation 4:

$$B \geq A - PS\left(\frac{X - Y}{DS} - t_{fill} + t_{door} - t_{delay}\right) \quad \text{(Eq. 4)}$$

Notably, the effective width of the ITS 38 (B) is dependent on a number of values that may be constant depending on the overall design and dimensions of a vehicle such as A, X, Y, and $t_{fill}$, whereas B is dependent on values that may be variable depending on the circumstances of a side impact event, such as PS, DS, $t_{door}$, and $t_{delay}$.

Figures 6A, 6B, 6C, 6D, 6E, 6F:
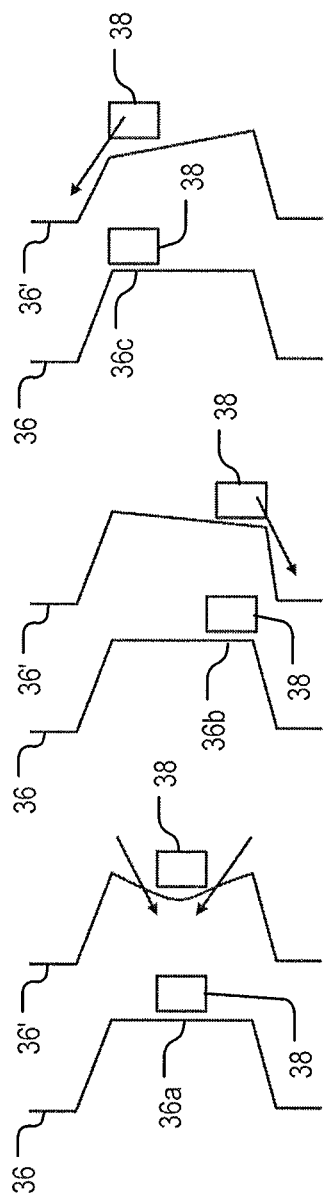
FIG. 6A is a schematic illustration of an embodiment of an impact transmission structure positioned proximate a center point of a side sill of a vehicle.
FIG. 6B is a schematic illustration of an embodiment of an impact transmission structure positioned proximate a lower end of a side sill of a vehicle.
FIG. 6C is a schematic illustration of an embodiment of an impact transmission structure positioned proximate an upper end of a side sill of a vehicle.
FIG. 6D is an example signal profile showing acceleration as a function of time as detected by a side impact system of a vehicle for the impact transmission structure of FIG. 6A.
FIG. 6E is an example signal profile showing acceleration as a function of time as detected by a side impact system of a vehicle for the impact transmission structure of FIG. 6B.
FIG. 6F is an example signal profile showing acceleration as a function of time as detected by a side impact system of a vehicle for the impact transmission structure of FIG. 6C.

Factors such as the placement of an ITS, or the characteristics of the core material (e.g., the honeycomb pressure distribution) may have an effect on the ability of an ITS to accurately and efficiently transmit a side impact signal. In one aspect, the size and location of the ITS may further affect transmission of a side impact signal as shown in FIGS. 6A-6F. More particularly, FIG. 6A illustrates a first example embodiment in which the ITS 38 is positioned at a center point 36a of the side sill reinforcement 36, FIG. 6B illustrates a second example embodiment in which the ITS 38 is positioned at a lower end 36b of the side sill reinforcement 36, and FIG. 6C illustrates a third example embodiment in which the ITS 38 is positioned at a upper end 36c of the side sill reinforcement 36. Each of FIGS. 6A-6C illustrates a before and after representation for a force applied to the ITS 38. Accordingly, the direction of the displacement of the ITS 38 is indicated by the arrows. Further, the side sill reinforcement 36 following the side impact event is denoted as side sill reinforcement 36'.

In an example configuration, a side impact may be configured to detect and analyze a transmission of a side impact signal. When an object strikes the side of the vehicle, a side impact signal is generated that may be transmitted through the various structures and components of the vehicle for detection by the side impact system. The side impact system may be configured to deploy a side airbag or actuate another safety system of a vehicle depending on the characteristics of a detected side impact signal. The side impact signal may have an oscillatory profile as shown, for example, FIGS. 6D-6F. Accordingly, it may be useful to determine if a side impact signal exceeds a threshold value, the number of times or the frequency with which the signal exceeds the threshold value, the slope of the signal, or other like characteristics. In one aspect, the robustness of the signal (i.e., the strength of the signal, the rate at which the signal attenuates, and the bandwidth of the signal that crosses a threshold value), may determine whether a side impact system actuates a safety system of the vehicle. Therefore, the placement of an ITS may have an influence on how robust a side impact signal is. For example, placement of the ITS may reduce or alter a signal during transmission of the through the structure of the vehicle, or promote the transmission of a side impact signal with little effect on the characteristics of the signal.

In the first example, placement of the ITS 38 at the center point 36*a* creates a localized deformation of the side sill reinforcement 36'. The deformation may produce an initial strong signal having a short duration or bandwidth once the side sill reinforcement 36' has collapsed or buckled at the center point 36*a* as shown in FIG. 6D. As illustrated in FIG. 6D, the signal profile may not be robust for crash detection. In one aspect, the signal may not exceed a threshold for detection (dotted line) following the initial spike. Further, the bandwidth of the signal may affect whether the signal is detected by the side impact system. For example, depending on the sampling frequency of the side impact system, a signal having a narrow bandwidth (e.g., FIG. 6D) may not be detected. Accordingly, it may be useful to place the ITS 38 at a point such as the lower end 36*b* or 36*c*.

In particular, the second and third examples provide the ITS 38 at either the lower end 36*b* or the upper end 36*c* of the side sill reinforcement 36. The ITS 38 may apply a force to the side sill reinforcement 36 that results in a robust or longer signal duration for detection by the side impact system 34 as shown in FIG. 6E, which corresponds to FIG. 6B, and in FIG. 6F, which corresponds to FIG. 6C. Note that the signal crosses the detection threshold (dotted line) more than once, which may be requirement for the activation of an airbag or other component by a side impact system. Further, the signals shown in FIGS. 6E and 6F have a broader bandwidth than the signal in FIG. 6D, which may be more readily detected by a side impact system. In one aspect, the walls of the side sill reinforcement 36 may be stronger or more robust for the transmission of an impact signal. Without intending to be limited to any one theory, placement of the ITS 38 as shown in FIGS. 6B and 6C may result in the transfer of a load from an object impinging on a vehicle during a side impact, thereby resulting in a global displacement of the vehicle body as opposed to a local displacement. The global displacement may contribute to the creation of a robust crash signal. In summary, in the case of an ITS that is relatively smaller than a side sill of the vehicle, it may be useful to place the ITS towards the sill walls as described above. By comparison, if the ITS is large enough to cover a significant portion of the side sill, it may be useful to position the ITS to achieve a pressure distribution along the walls of the side sill opposed to at a center point of the sill center.

Turning now to FIGS. 7A-7H, in some embodiments, it may be useful to vary the relative dimensions of a honeycomb structure or a core structure of an ITS to achieve an a robust transmission of a side impact signal. In one aspect, the size, thickness or a combination thereof of the polyhedral structures of a honeycomb structure may be directly related to the stiffness or pressure distribution of an ITS. For example, a smaller or thicker honeycomb structure may result in an ITS having a relatively greater stiffness than an ITS having a larger or thinner honeycomb structure. It should be noted that as in FIGS. 6A-6C, the direction of the displacement of the ITS 38 in FIGS. 7A-7D is indicated by the arrows. Moreover, the side sill reinforcement 36 following the side impact event is denoted as a side sill reinforcement 36'.

In a first example shown in FIG. 7A, an embodiment of an ITS 70 includes a honeycomb structure having relatively large polyhedral structures 70*a*. The large polyhedral structures 70*a* may be hexagonal prisms having a relatively larger cross-section diameter ($D_1$). The polyhedral structures 70*a* may absorb energy transmitted by an object to the ITS 70 during a side impact event. However, the large polyhedral structures 70*a* may not be effective in transmitting signal associated with a side impact event as illustrated in FIG. 7E. In particular, the signal does not exceed the detection threshold (dotted line) over the entire time course of the side impact event.

In a second example shown in FIG. 7B, an embodiment of an ITS 72 includes a honeycomb structure having relatively small polyhedral structures 72*a* proximate a center point 36*a* of the side sill reinforcement 36. The small polyhedral structures 72*a* may be hexagonal prisms having a relatively smaller cross-section diameter ($D_2$) as compared, for example with $D_1$. The location of the polyhedral structures 72*a* proximate the center point 36*a* may creates an initial strong impact transmission signal as shown in FIG. 7F. However, the signal may have a short duration or narrow bandwidth once the center point 36*a* collapses due to the force of the impact. In one aspect, concentrated stiffness due to the dimensions and location of the polyhedral structures 72*a* may create a localized force, thereby causing a local deformation of the side sill reinforcement 36 without providing a robust signal transmission.

Turning now to FIGS. 7C and 7G, a third example of an ITS 74 includes a honeycomb structure having a plurality of polyhedral structures 74*a* with a diameter ($D_3$) that is selected to provide the ITS 74 with a stiffness that is matched that the stiffness of the side sill reinforcement 36. In one aspect, the polyhedral structures 74*a* are uniformly distributed along the side sill reinforcement 36. The uniform distribution of the polyhedral structures 74*a* may provide a robust signal transmission or a signal having a longer duration as illustrated in FIG. 7G. Notably, the signal exceeds the threshold (dotted line) more than once.

Similarly, a fourth example of an ITS 76 includes a honeycomb structure having polyhedral structures 76*a* with the smallest diameter ($D_4$) as compared with the first, second, and third examples shown in FIGS. 7A-7C. In one aspect, the signal strength depicted in FIG. 7H may depend on whichever of the ITS 76 and the side sill reinforcement 36 has the smaller stiffness. That is, if the ITS 76 has a stiffness that is relatively greater than the stiffness of the side sill reinforcement 36, then there may be no perceived benefit (e.g., a more robust or longer lasting signal) over an ITS that has a stiffness that is about equal to the stiffness of the side sill reinforcement 36. Accordingly, as the detected signal strength may plateaus as the stiffness of an ITS approaches the stiffness of the side sill reinforcement 36, it may be useful to match the stiffness of the ITS to the stiffness of the side sill.

Figure 8A:
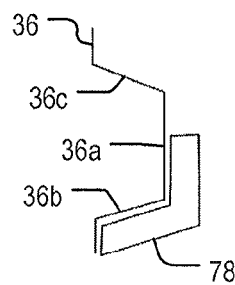
FIG. 8A is a schematic illustration of an embodiment of an impact transmission structure positioned about a lower end of a side sill of a vehicle.
Figure 8B:
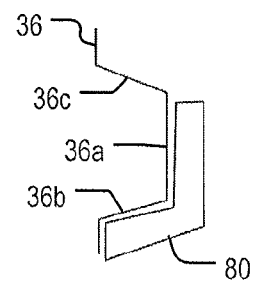
FIG. 8B is a schematic illustration of an embodiment of an impact transmission structure positioned about a center point and a lower end of a side sill of a vehicle.
Figure 8C:
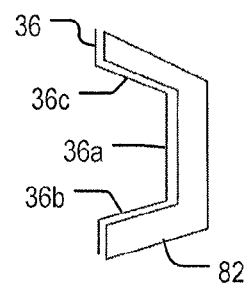
FIG. 8C is a schematic illustration of an embodiment of an impact transmission structure positioned about an upper end, a center point, and a lower end of a side sill of a vehicle.

Tuning to FIGS. 8A-8C, it may be seen that additional embodiments of an ITS may have relatively varied dimensions without departing from the scope of the present disclosure. For example, an ITS 78 in FIG. 8A may extend about only the lower end 36*b* of the side sill. However, in another example, an ITS 80 may extend about the center point 36*a* and the lower end 36*b* of the side sill reinforcement 36 as illustrated in FIG. 8B. Further, another embodiment of an ITS 82 may extend about the upper end 36*c* of the side sill reinforcement 36 in addition to the center point 36*a* and the lower end 36*b*. Each of the ITS 78, the ITS 80 and the ITS 82 may provide for a robust transmission of a side impact signal as described above. Accordingly, coverage of the side sill reinforcement 36 or another component of the vehicle 20 may not be limited to the lower end 36*b* of the side sill reinforcement 36 to be effective for the generation and transmission of a side impact signal during a side impact event.

Figure 9:
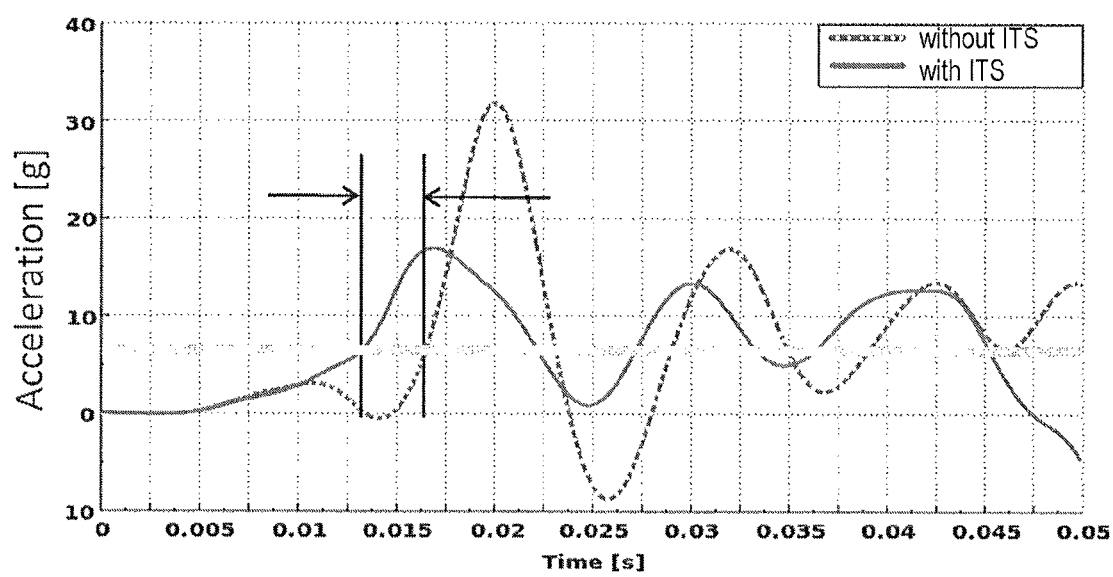
FIG. 9 is an example side impact transmission signal profile showing acceleration as a function of time as detected by a side impact system of a vehicle either with or without an impact transmission structure.

Notably, the surprising discovery has been made that through the inclusion of an ITS, a more robust side impact transmission signal may be achieved as compared with a similar vehicle without an ITS. Furthermore, the signal generated with the ITS may be detected earlier on during a side impact event as compared with a similar vehicle that does not have an ITS. As illustrated in FIG. 9, a vehicle including an ITS (solid line) may have a signal that is detected earlier on in an impact event as compared with a vehicle without an ITS (dashed line). In one aspect, the ITS may increase the detection time by about 2.5 ms to about 3.0 ms as indicated by the solid vertical lines denoting the initial intersection of each of the signals shown with the threshold (thick grey line). In another aspect, the signal for the vehicle including the ITS may ramp up faster (i.e., the signal data may have a greater initial slope or earlier onset) relative to intrusion than the signal for the vehicle without the ITS.

The present invention has been described in terms of one or more preferred embodiments, and it should be appreciated that many equivalents, alternatives, variations, and modifications, aside from those expressly stated, are possible and within the scope of the invention.

Each reference identified in the present application is herein incorporated by reference in its entirety.

While present inventive concepts have been described with reference to particular embodiments, those of ordinary skill in the art will appreciate that various substitutions and/or other alterations may be made to the embodiments without departing from the spirit of present inventive concepts. Accordingly, the foregoing description is meant to be exemplary, and does not limit the scope of present inventive concepts.

A number of examples have been described herein. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the present inventive concepts.

What is claimed is:

1. A vehicle, comprising:
   a frame including a side sill reinforcement, the side sill reinforcement running along a length of a side of the frame; and
   an impact transmission structure mounted to and extending laterally outward from an exterior surface of the side sill reinforcement, the impact transmission structure having a stiffness within 5% of a stiffness of the side sill reinforcement,
   wherein the impact transmission structure includes a plurality of polyhedral structures oriented along a primary axis, the primary axis being orthogonal to the side sill reinforcement.

2. The vehicle of claim 1, wherein the impact transmission structure includes a honeycomb structure.

3. The vehicle of claim 1, wherein the polyhedral structures are hexagonal prisms.

4. The vehicle of claim 1, including a side impact system including at least one sensor for the detection of the side impact.

5. The vehicle of claim 4, wherein the at least one sensor comprises an accelerometer.

6. The vehicle of claim 1, wherein the impact transmission structure includes
   a mounting face formed along an exterior surface of the body, the mounting face configured to mount to at least one of the exterior surface of the side sill reinforcement and a side sill garnish.

7. The vehicle of claim 6, wherein, when the mounting face is mounted to the exterior surface of the side sill reinforcement.

8. The vehicle of claim 6, wherein a stiffness of the honeycomb structure is within 5% of the stiffness of the side sill reinforcement extending along the side of the vehicle.

9. The vehicle of claim 1, further comprising:
   a vehicle body including the side sill reinforcement, the side sill reinforcement projecting laterally outward from an exterior of the vehicle body, and extending at least partially between a front end and a rear end of the vehicle body;
   a seat mounted to the vehicle body;
   a door coupled to the vehicle body, the door having an interior panel and an exterior panel; and
   an airbag coupled to at least one of the body and the seat and deployable between an occupant position in the seat and the door to occupy a lateral distance between an outside edge of the occupant and the interior panel of the door;
   wherein the impact transmission structure abuts the side sill reinforcement proximate the seat and extends laterally outward from an exterior surface of the side sill reinforcement.

10. The vehicle of claim 1, wherein the side sill reinforcement has an upper end, a center point, and a lower end, and wherein the impact transmission structure is positioned proximate at least one of the upper end and the lower end of the side sill reinforcement.

11. An impact transmission structure, comprising:
    a body including a honeycomb structure, the honeycomb structure including a plurality of polyhedral structures, each one of the plurality of polyhedral structures having a primary axis; and
    a mounting face formed along an exterior surface of the body, the mounting face configured to mount to an exterior surface of a side sill reinforcement extending along a side of a vehicle, wherein, when the mounting face is mounted to the exterior surface of the side sill reinforcement, the primary axes of the plurality of polyhedral structures are orthogonal to the side sill reinforcement;
    wherein a stiffness of the honeycomb structure is within 5% of a stiffness of the side sill reinforcement extending along the side of the vehicle.

12. The impact transmission structure of claim 11, wherein the side sill reinforcement has an upper end, a center point, and a lower end, and wherein the impact transmission structure is shaped to mount to the side sill reinforcement proximate at least one of the upper end and the lower end of the sill.

13. The impact transmission structure of claim 11, wherein the side sill reinforcement has an upper end, a center point, and a lower end, and wherein the impact transmission structure is shaped to mount to the side sill reinforcement proximate the center point and at least one of the upper end and the lower end of the sill.

14. The impact transmission structure of claim 11, wherein the side sill reinforcement has an upper end, a center point, and a lower end, and wherein the impact transmission structure is shaped to mount to the side sill reinforcement proximate the each of the upper end, the center point, and the lower end of the side sill reinforcement.

15. The impact transmission structure of claim 11, wherein the polyhedral structures are hexagonal prisms.

16. A vehicle, comprising:
- a body, the body including a side sill reinforcement projecting laterally outward from an exterior of the body, the sill extending at least partially between a front end and a rear end of the body;
- a seat mounted to the body;
- an impact transmission structure abutting the side sill reinforcement proximate the seat and extending laterally outward from an exterior surface of the side sill reinforcement;
- a door coupled to the body, the door having an interior panel and an exterior panel; and
- an airbag coupled to at least one of the body and the seat and deployable between an occupant positioned in the seat and the door to occupy a lateral distance (Y) between an outside edge of the occupant and the interior panel of the door;
- wherein a width (B) of the impact transmission structure is determined by at least (i) a lateral distance (A) between an exterior surface of the sill and the exterior panel of the door, (ii) a lateral distance (X) between the outside edge of the occupant and the interior panel of the door, and (iii) the lateral distance of an airbag deployable between the occupant and the interior panel of the door (Y).

17. The vehicle of claim 16, wherein the width (B) is determined by the equation:

$$B \geq A - PS((X-Y)/DS - t\_\text{fill} + t\_\text{door} - t\_\text{delay}),$$

wherein PS is the velocity of an object incident on the door, DS is the velocity of a lateral displacement of the door toward an interior of the vehicle following an impact with the object, tfill is the time required for to inflate the airbag to a deployed state of the airbag, tdoor is the time associated with the delay between the initial impact of the object with the door and the lateral displacement of the door, and tdelay is the delay in associated with a processing time for a side impact system for deploying the airbag.

18. The vehicle of claim 17, wherein the sill has an upper end, a center point, and a lower end, and wherein the impact transmission structure is shaped to mount to the side sill reinforcement proximate at least one of the upper end and the lower end of the side sill reinforcement.

19. The vehicle of claim 16, wherein the impact transmission structure comprises:
- a body including a honeycomb structure, the honeycomb structure including a plurality of polyhedral structures, each one of the plurality of polyhedral structures having a primary axis; and
- a mounting face formed along the exterior surface of the body, the mounting face configured to mount to the exterior surface of the side sill reinforcement;
- wherein, when the mounting face is mounted to the exterior surface of the side sill reinforcement, the primary axes of the plurality of polyhedral structures are orthogonal to the side sill reinforcement, and
- wherein a stiffness of the honeycomb structure is within 5% of a stiffness of the side sill reinforcement.

* * * * *